(12) United States Patent
Helmer

(10) Patent No.: US 6,536,132 B2
(45) Date of Patent: Mar. 25, 2003

(54) REUSABLE CLOTHES DRYER LINT COLLECTION MITT AND METHOD OF MANUFACTURE

(76) Inventor: Lisa Dawn Helmer, 2918 - 11th Ave. W., Bradenton, FL (US) 34205

( * ) Notice: Subject to any disclaimer, the term of this patent is extended or adjusted under 35 U.S.C. 154(b) by 0 days.

(21) Appl. No.: 10/003,654

(22) Filed: Oct. 23, 2001

(65) Prior Publication Data

US 2002/0108268 A1 Aug. 15, 2002

Related U.S. Application Data

(63) Continuation-in-part of application No. 09/780,801, filed on Feb. 9, 2001, now Pat. No. 6,305,843.

(51) Int. Cl.$^7$ ............ F26B 21/06; B65D 33/00
(52) U.S. Cl. .............. 34/82; 383/41; 206/278
(58) Field of Search .............. 34/82, 79; 206/278; 383/41; 424/402; 32/40; 2/161.6

(56) References Cited

U.S. PATENT DOCUMENTS 6,360,373 B1 * 3/2002 Rehn et al. .......... 2/161.6
6,425,136 B1 * 7/2002 Schlamp et al. ........ 2/159

* cited by examiner

Primary Examiner—Pamela A Wilson
(74) Attorney, Agent, or Firm—Dorothy S. Morse

(57) ABSTRACT

A reusable device, and alternative methods of manufacture, for fast, efficient, fingernail preserving, and unfragmented removal of accumulated lint from clothes dryer filters. Each embodiment comprises a mitt and an attached storage pouch having upper and lower ends that can be independently manipulated for the addition and removal of lint. It also comprises magnetic means for attachment of the pouch to a dryer so that it remains conveniently accessible for use. The mitt preferably has two thumbs for interchangeable right-handed and left-handed use. Applications may include, but are not limited to, use by homeowners and cleaning services to facilitate the repetitive task of removing accumulated lint from clothes dryer lint filters needed to promote safe use of clothes dryers in homes, school dormitories, apartment complexes, and other residence facilities, as well as in laundromats, other commercial cleaning establishments, hotel laundries, hospital laundries, and the laundry facilities of uniform rental services.

20 Claims, 5 Drawing Sheets

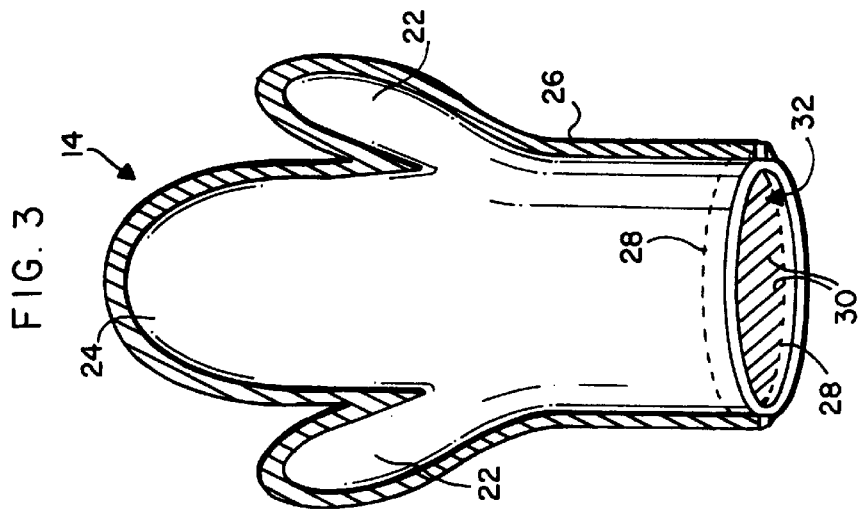
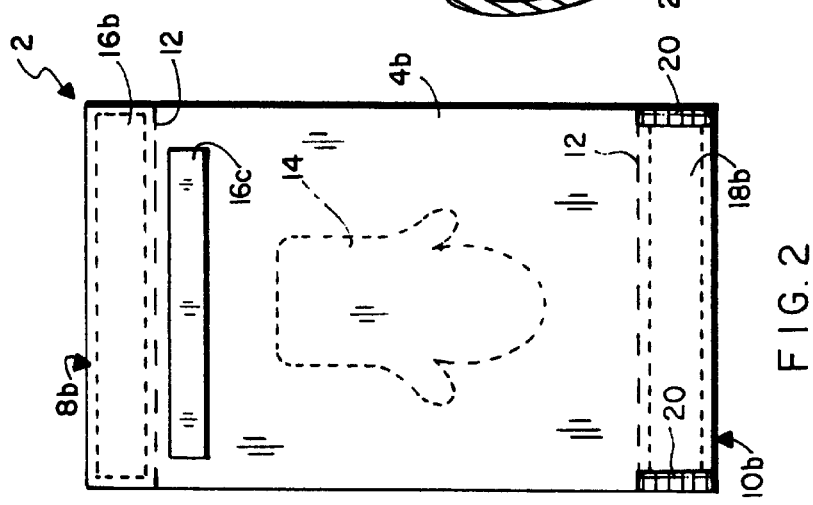
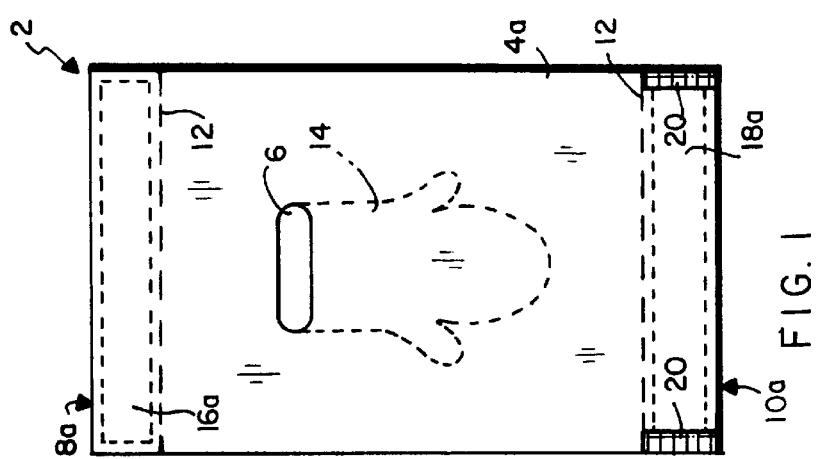

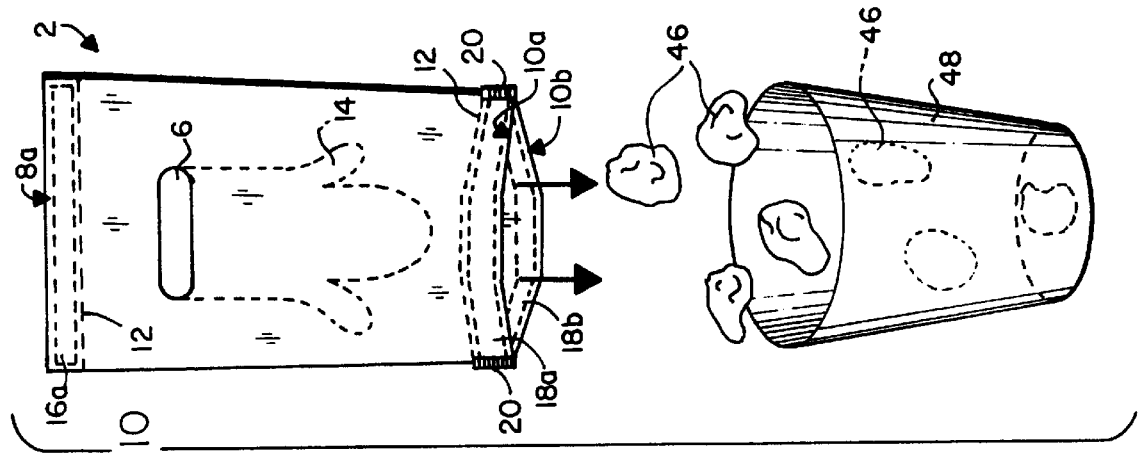
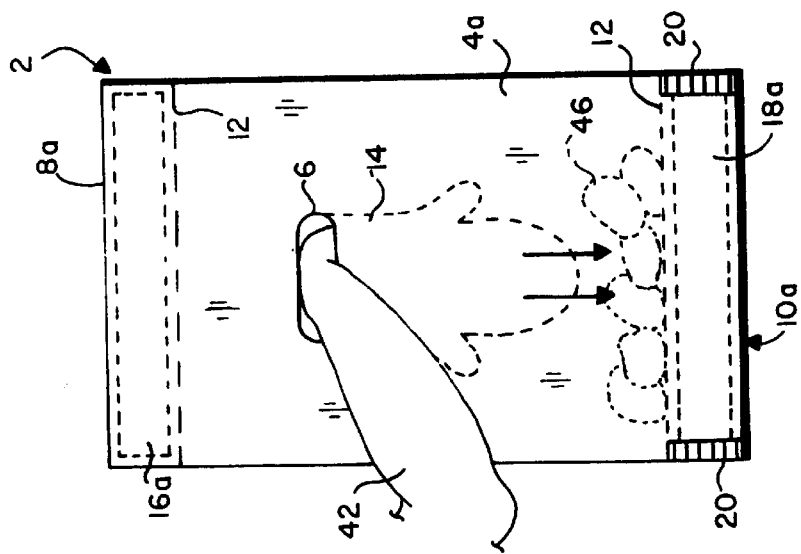
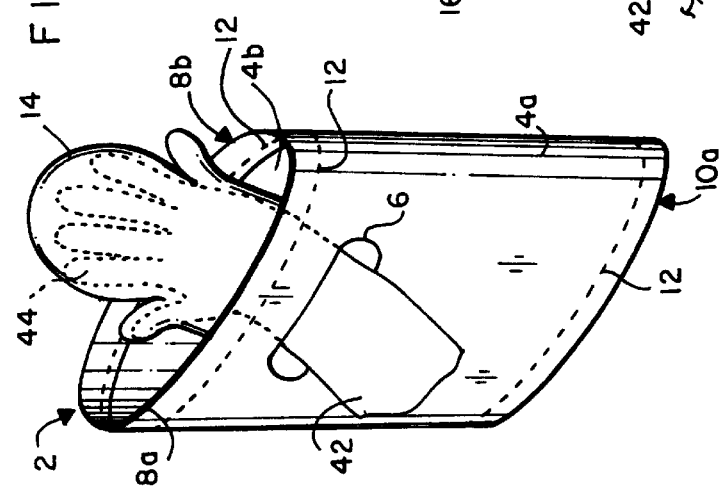

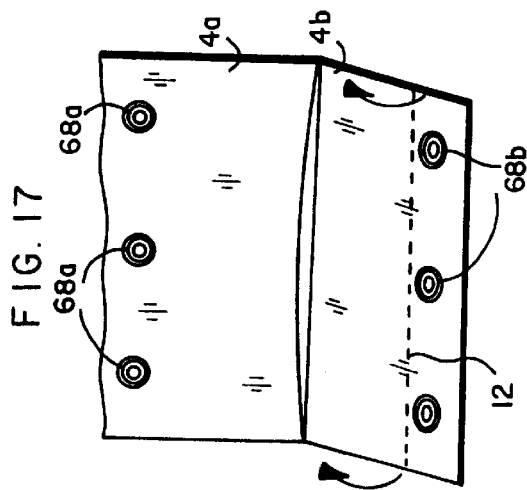
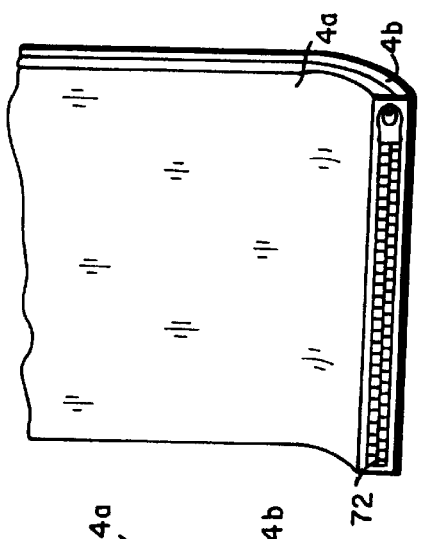
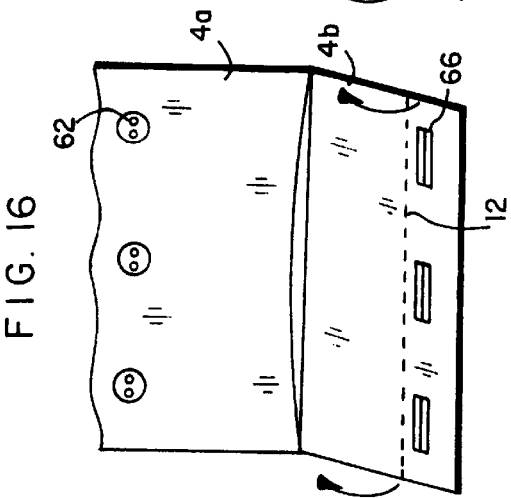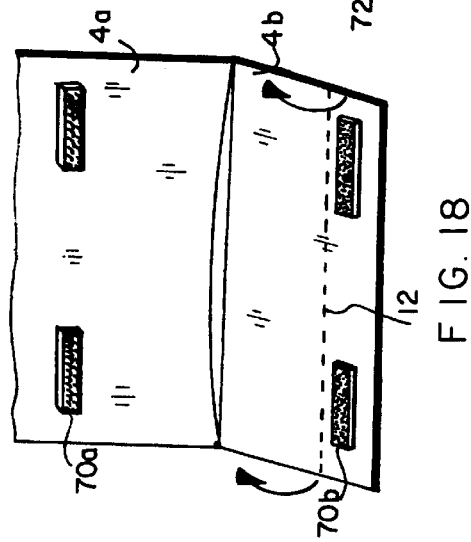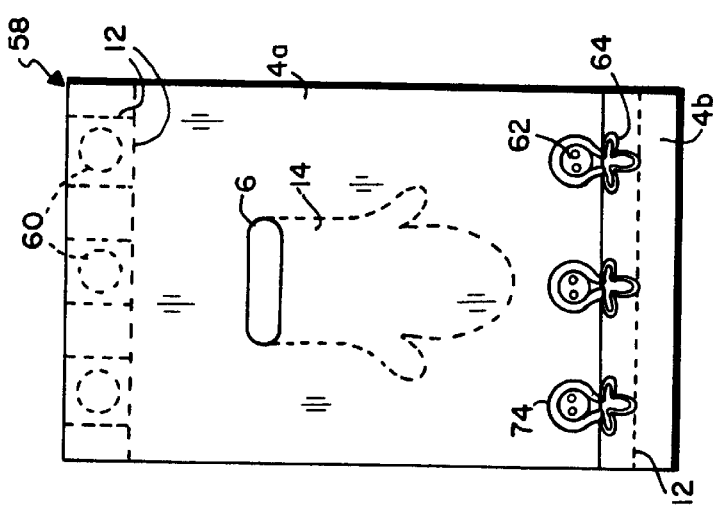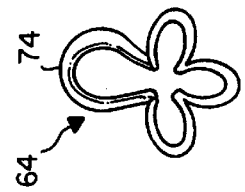

REUSABLE CLOTHES DRYER LINT COLLECTION MITT AND METHOD OF MANUFACTURE

This is a continuation-in-part patent application of Ser. No. 09/780,801 filed Feb. 9, 2001 now U.S. Pat. No. 6,305,843 by the same inventor.

BACKGROUND

1. Field of Invention

This invention relates to methods and devices used for removing accumulated lint from clothes dryer lint filters, specifically to reusable devices and methods for their manufacture, wherein such devices comprise a mitt made of soft lint-attracting fabric and optionally having a ridge-like bound seam to aid in lint collection, in combination with a storage pouch that has easily opening upper and lower ends, each of which can be independently opened and closed for the prompt addition or removal of clothes dryer lint from the pouch. Also, the mitt is preferably attached to the pouch through a side opening in the pouch material near to its upper end, so that when the upper end is opened, a hand can be inserted into the mitt to temporarily extend the mitt beyond the upper end of the pouch for use of an optional protruding, bound, ridge-like seam on the mitt extending at a minimum over the fingers containing, as well as the soft lint-attracting mitt fabric itself, to neatly and efficiently retrieve accumulated lint from a clothes dryer lint filter with minimal lint fragment dispersal, and also to securely hold onto the removed lint during its transport to the pouch and subsequent transfer of the collected lint into the pouch with minimal mess. Without the mitt, fingernails and fingertips of the person removing the lint are typically used to separate accumulated lint from a clothes dryer lint filter, which often causes direct fingernail contact with the lint filter and fingernail damage, as well as for small fragments of the accumulated lint to be left behind on the filter, to collect under the fingernails used for lint filter cleaning, or to break away from the main body of retrieved lint and become dispersed into the room within which the dryer is located. Since accumulated lint is easily gathered into a compact mass by the protruding bound seam of the mitt, when it is used, and lint fragments are attracted to its soft fabric, the present invention helps to quickly separate the accumulated lint from a clothes dryer filter, remove more lint in less time than an uncovered hand attempting to perform the same task, and remove the lint with less damage to fingernails and chipping of fingernail polish that would otherwise occur when fingertips alone are used as the main tool for separating the accumulated lint from a clothes dryer filter. At any time after lint collection, the pouch of the present invention can be easily emptied of lint by placing the pouch over a convenient waste container, opening the pouch's lower end, and letting gravity assist in the downward movement of lint into the waste container. Between uses, magnets are employed to attach the pouch to the outside surface of the clothes dryer housing, so that it remains conveniently accessible to those having the responsibility to remove and dispose of accumulated lint resulting from the clothes dryer operation. Also, the mitt preferably has two opposed thumbs so that it is available for immediate right-handed and left-handed use without accommodation. Applications may include, but are not limited to, use by residents, as well as professional cleaning service personnel, to facilitate the repetitive task of removing accumulated lint from clothes dryer lint filters that is necessary to promote safe use of clothes dryers in homes, school dormitories, assisted living facilities, apartment complexes, and other residence facilities. The device could also have commercial applications, such as but not limited to, use in public laundromats, other commercial cleaning establishments, and the laundries of hotels, motels, nursing homes, and hospitals, as well as the laundry facilities of companies providing uniform rentals.

2. Description of Prior Art

Routine use and laundering of woven and knit fabrics, particularly cotton fabrics in clothing and linens, creates lint. As a result of the rubbing of one part of a fabric against another during use, as well as other forms of fabric contact with various objects encountered during use, threads employed to knit and weave fabrics can become broken. Subsequently when the fabrics are machine laundered and dried, broken fiber fragments are separated from the fabric and thereafter become accumulated in the form of lint on the respective lint filters of washers and dryers. Additional surface debris clinging to the fabrics prior to laundering, such as carpet fibers and pet hair, will also become separated from the fabrics during the cleaning process and deposited on the washer or dryer lint filters as part of the accumulated lint. To allow for efficient, sanitary, and safe operation of the washers and dryers used, accumulated lint needs to be periodically removed from the respective filters. Much of the coarse lint generated during a mechanized cleaning process is removed during the washing phase, as long as the washing machine tub is not overloaded and the items in the tub can be adequately rinsed. This coarse lint is usually damp and generally poses little fire hazard threat. However, as clothes dryer lint is dry and generally comprised of smaller dimensioned particulate matter, if it is not frequently removed from clothes dryer lint filters, it will create a fire hazard risk. Further, since laundering merely sanitizes fabrics and does not remove all microbes from them, accumulated lint also will contain microbes, with more microbes being present when washers are so overloaded that clothes are not properly allowed to circulate during wash and rinse cycles. Therefore, complete and thorough removal of lint from washer and dryer lint filters, also helps to promote a more sanitary laundering result.

When fingertips alone are used, lint removal from clothes dryer lint filters is an untidy process. Fragments of lint tend to cling to the filter even after multiple attempts are made to remove it, with other fragments sticking to the hand attempting to remove it or becoming readily dispersed as a fine dust into the area immediately surrounding the dryer. Several passes of the fingertips across a clothes dryer lint filter are also usually required to remove the bulk of the accumulated lint attached to it, unless a thick mat of accumulated lint has been allowed to amass in the filter. Although a thicker mat is often more readily removed without fragmentation and lint dispersal, it is undesirable to allow lint to accumulate into a thick mat as doing so tends to pose a greater fire hazard risk. Other disadvantages of fingertip lint removal are that fragments of lint can cling to the hand employed to retrieve it and also collect under fingernails, requiring additional time to clean them. Lint removal with unprotected fingers also leads to fingernail breakage and fingernail polish chipped through direct contact of the fingernails with the lint filter. The present invention overcomes the above-mentioned disadvantages by offering an alternative lint removal process that is faster, more efficient, neater, safer, and promotes a more sanitary operation, with less lint remaining attached to the filter and less fragmented lint particles being dispersed into the air in the immediate vicinity of the dryer, as well as a less damaging result for the fingernails and/or fingernail polish of the person removing the lint. No device is known that has all of the advantages of the present invention.

SUMMARY OF INVENTION—OBJECTS AND ADVANTAGES

The primary object of this invention is to provide alternative methods for the manufacture of reusable devices that will efficiently remove and temporarily store accumulated dryer lint from clothes dryer lint filters. It is a further object of this invention to provide methods for manufacturing reusable lint-removing devices that allow for rapid and thorough cleaning of clothes dryer lint collection filters. It is also an object of this invention to provide methods for manufacturing reusable clothes dryer lint-removal devices that are durable and easy to use. It is a further object of this invention to provide methods for manufacturing reusable lint-removal devices that can be rapidly and easily emptied of accumulated lint. A further object of this invention is to provide methods for manufacturing reusable clothes dryer lint-removal devices that can be stored between uses in the immediate vicinity of the dryer so as to be made easily accessible to a person needing to perform the lint removal task. It is also an object of this invention to provide methods for manufacturing reusable lint-removal devices that minimize the risk of damage to fingernails and fingernail polish during clothes dryer lint filter cleaning. It is a further object of this invention to provide methods for manufacturing reusable lint-removal devices that can be cost effectively manufactured for widespread distribution and use.

As described herein, properly manufactured and used, the present invention would enable rapid, thorough, and neat removal of lint from clothes dryer filters. Since the mitt of the present invention is attached to a lint storage pouch, dryer lint removed by the mitt can be immediately transferred to the pouch after collection, while the mitt is still near to the clothes dryer filter, thereby eliminating the need for uncovered transport of fragmented lint particles to a remote waste container that otherwise tends to result in the dispersal of at least a portion of those fragments into the area immediately surrounding a clothes dryer. Further, although not critical, the embodiment of the present invention mitt preferred for high volume use in a home or use by a group of people living in a dormitory or apartment complex, would be manufactured with a protruding bound seam that helps to roll the lint into a compact mass as the mitt is drawn across a clothes dryer filter, instead of buckling and/or fractionating portions of the accumulated lint into easily dispersed fragments, as tends to happen when exposed fingertips and fingernails are used to separate the lint from a filter. The bound seam is also helpful for filters having lint collection surfaces with a deeper basket-like configuration. For less frequent household use or with lint filters having a flatter configuration, the bound seam can be omitted, or made smaller in size, leaving the soft mitt material as the primary means of avoiding lint fragmentation during lint collection process. Also, particularly when protected by a protruding bound seam, the fingernails of the person removing the lint would not be placed at risk for damage, as they would not come in direct contact with the lint filter. In addition, any lint fragments dislodged from the clothes dryer filter while the bulk of the lint is being rolled into a compact mass, would tend to be immediately attracted to the soft material of the mitt and cling to it, minimizing the amount of lint becoming dispersed as a fine dust into the air immediately surrounding the dryer. When a clothes dryer lint filter is regularly cleaned, the present invention mitt tends to remove nearly all of the accumulated lint thereon in one pass of the mitt across the filter, multiple passes of the mitt being only anticipated for an unusually heavy deposit of lint, such as that expected during the laundering of new towels or blankets. The multiple-part magnetic closure in the upper end of the pouch of the present invention makes it easy to open, for rapid mitt extension beyond the upper perimeter of the pouch and prompt gathering of lint from clothes dryer filters. Once the mitt is placed back inside the pouch, the magnetic closure can be quickly used to seal the pouch and prevent lint dispersal while the pouch is being transported back to its storage position on the outer surface of a clothes dryer housing, where it would remain conveniently situated for subsequent uses. If the size of the magnets used for upper end closure is adequate, those magnets can also provide a means for attachment of the pouch to the dryer housing. Should smaller closure magnets be used for the upper end, or a larger and heavier pouch be desired for commercial or large resident facility use, one or more additional magnets can be connected to the back of the pouch and used for dryer housing attachment. The lint holding capacity of the pouch would be made to accommodate multiple lint filter cleanings in the contemplated application, before emptying is required, preferably containing the lint from at least eight to ten routine dryer cycles. Then, to dispose of the accumulated lint which has been transported in the pouch to a location remote from the dryer, the lint would be emptied into an appropriate waste container by simply opening the lower end of the pouch over the open upper end of the waste container and letting gravity do most of the work in causing the downward release of lint directly into the waste container. Slight shaking of the pouch might be required to release all of the collected lint, even though pouch material having a smooth inner surface would typically be used. In this way the placement of collected lint into an open container adjacent to the dryer is avoided, a practice that only allows for more of the finer lint fragments to become dispersed into the air surrounding the dryer each time a new quantity of lint or other discarded objects are added to the waste container. The lower end of the pouch can be manufactured for closure by any easily-opened closure means, to include but not be limited to buttons, buttonholes, large snaps, hook and pile types of fasteners, magnets, zippers, spring-biased two-part handbag frame closures, crocheted frogs, and any combination thereof. The pouch preferably would be made from a lightweight durable material, such as nylon, so that it, the attached mitt, and a maximum contemplated quantity of accumulated lint can easily be supported by magnetic means against the outer surface of a dryer housing. It is also preferred that the pouch be manufactured from a material to which the accumulated lint does not readily adhere. Further, although not critical, it is preferred that the pouch, the mitt, and the bottom and top pouch closures, all be manufactured from washable materials. It is considered within the scope of the present invention for the pouch to have a lining when a pouch fabric is chosen for its surface decoration instead of its functional advantages, even though for weight considerations a lining is generally not preferred. Since the present invention has few parts to assemble, and different bottom closures are contemplated to accommodate user preference and price point considerations, the present invention could be cost effectively manufactured for widespread use. Different methods of manufacture may also include different orders of assembling the various components used.

The description herein provides the preferred embodiments of the present invention but should not be construed as limiting the scope of the methods used for manufacturing different alternative embodiments of the present invention that remove accumulated lint from clothes dryer lint collection filters. For example, variations in the length and width of the lint containing pouch; the number of magnets attached to the pouch; the size, configuration, and location of the side opening in the pouch to which the mitt is attached; the type of stitching used to make a bound seam in the mitt; the length and width dimensions of the mitt; the number of thumbs made in the mitt; the means of closure used for the lower end of the pouch; and the perimeter and thickness dimensions, as well as the configuration, of the magnets used for closure of the upper end of the pouch; other than those shown and described herein may be incorporated into the present invention. Thus the scope of the present invention should be determined by the appended claims and their legal equivalents, rather than the examples given.

BRIEF DESCRIPTION OF THE DRAWINGS

FIG. 1 is a front view of a fully manufactured first preferred embodiment of the present invention having a lint storage pouch with upper and lower closures, and a mitt attached to a side opening in the lint storage pouch so that the opening allows for insertion of a hand into the mitt for use, the mitt being shown in broken lines to indicate its typical downwardly extending stored position within the pouch.

FIG. 2 is a back view of a fully manufactured first preferred embodiment having a lint storage pouch with upper and lower closures, a mitt positioned within the lint storage pouch, and a horizontally extending magnetic strip attached to the back of the pouch for use in attachment of the lint storage pouch to the side wall or door of a clothes dryer housing.

FIG. 3 is a perspective view of an assembled mitt used in the first preferred embodiment, the mitt having two thumb members for immediate left-handed and right-handed use without accommodation and a protruding bound perimeter seam connecting the front and back halves of the mitt together, with a lower opening available for use in the insertion of a hand.

FIG. 4 is a perspective view of one possible configuration of the magnetic closure means used in the first preferred embodiment to close the top opening in the lint storage pouch, as well as a possible configuration for the magnetic attachment means for the lint storage pouch to the outer surface of a clothes dryer housing.

FIG. 8 is a perspective view of the mitt of the first preferred embodiment fully manufactured and extending beyond the top edges of the lint storage pouch in a position of lint collection use.

FIG. 9 is a front view of the fully manufactured first preferred embodiment showing transfer of collected lint from the mitt into the bottom of the lint storage pouch.

FIG. 10 is a front view showing collected lint being emptied from the lint storage pouch of the fully manufactured first preferred embodiment into an independent waste container having a wide top opening.

FIG. 14 is a front view of a second preferred embodiment of the present invention with the bottom closure of the lint storage pouch consisting of identical numbers of buttons and frogs, the enlarged loop of each frog engaging a different one of the buttons, and the top end closure means for the lint storage pouch consisting of several small magnets each isolated in a separate pocket-like compartment and positioned for engagement with an opposing closure magnet.

FIG. 15 is an enlargement of one possible configuration of a frog used in the second preferred embodiment and having an enlarged stretchable loop adapted to fit securely around a selected size of button.

FIG. 16 is a front view of a third preferred embodiment of the present invention having a bottom end closure consisting of several spaced-apart buttons and buttonholes that are in opposing positions for engagement with one another.

FIG. 17 is a front view of a fourth preferred embodiment of the present invention having a bottom closure consisting of several spaced-apart two-part snaps.

FIG. 18 is a front view of a fifth preferred embodiment of the present invention having a hook-and-pile type of bottom end closure means.

FIG. 19 is a front view of a sixth preferred embodiment of the present invention having a bottom end zipper closure.

DETAILED DESCRIPTION OF PREFERRED EMBODIMENTS

Figure 7:
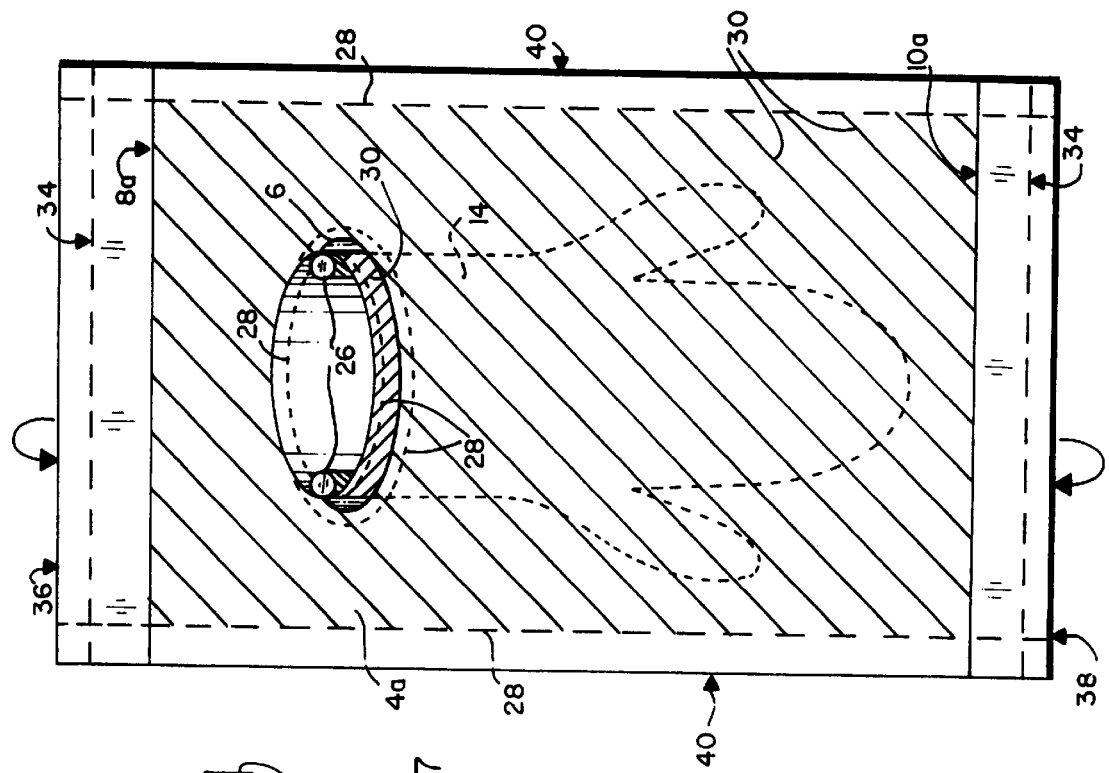
FIG. 7 is a back view of the front panel of the first preferred embodiment prior to folding and stitching of the top and bottom ends, or side seams, of the front panel with unnumbered top and bottom arrows showing the direction of folding.

FIGS. 1 and 2 show a fully manufactured first preferred embodiment 2 of the present invention having a front pouch panel 4a, a back pouch panel 4b, a substantially horizontally extending connective opening 6 laterally centered through front pouch panel 4a, no similar opening 6 through back pouch panel 4b, and a mitt 14 connected to front pouch panel 4a in such a way as to seal opening 6 and make the interior of mitt 14 accessible through opening 6. In addition, FIG. 1 shows front pouch panel 4a in first preferred embodiment 2 having an upper end with a front top edge 8a, a lower end with a front bottom edge 10a, two substantially horizontally extending rows of stitching 12 between front top edge 8a and front bottom edge 10a, an elongated front magnetic strip 16a adjacent to front top edge 8a, an elongated handbag frame front member 18a connected on its opposing ends to hinges 20 and positioned adjacent to bottom front edge 10a, and mitt 14 having two opposed thumb members, identified by the number 22 in FIG. 3. FIG. 1 also shows one row of stitching 12 being positioned above mitt 14 and adjacent to, although below, elongated front magnetic strip 16a, as well as a second row of stitching 12 being positioned below mitt 14 and adjacent to, although above, handbag frame elongated front member 18a. FIG. 2 further shows back pouch panel 4b in first preferred embodiment 2 having an upper end with a top back edge 8b, a lower end with a back bottom edge 10b, two horizontally extending rows of stitching 12 between top back edge 8b and back bottom edge 10b, an elongated back magnetic strip 16b positioned adjacent to top back edge 8b, and an elongated handbag frame back member 18b connected on its opposing ends to hinges 20, as well as an additional elongated back magnetic strip 16c attached to back pouch panel 4b between elongated back magnetic strip 18b and mitt 14, and in a horizontally extending orientation that is substantially parallel to top back edge 8b. FIG. 2 also shows one row of stitching 12 being positioned above mitt 14 and adjacent to the lower edge of elongated back magnetic strip 16b, and a second row of stitching 12 being positioned below mitt 14 and adjacent to the upper edge of handbag frame back member 18b. Although FIGS. 1 and 2 show a pouch being made from two pouch components, front pouch panel 4a and back pouch panel 4b, it is also considered to be within the scope of the present invention for the pouch to be made from one larger piece of fabric having the approximate combined dimension of front pouch panel 4a and back pouch panel 4b, with only one stitched longitudinal seam, such as seam 28 shown in FIG. 7, instead of two seams 28, or for the present invention to have a pouch made from tubular material requiring no longitudinal seams 28.

In FIG. 1, stitching 12 is shown in two places on front pouch panel 4a, to assist in sealing hidden elongated front magnetic strip 16a within a hemmed enclosure or pocket adjacent to front top edge 8a and hidden handbag frame front member 18a within an independent hemmed enclosure or pocket adjacent to bottom front edge 10a, and unless otherwise restricted by stitching or other means, elongated front magnetic strip 16a and handbag frame front member 18a would be able to slide freely within its respective hemmed enclosure or pocket. Should a smaller front magnetic strip 16a than is shown in FIG. 1 be used for weight or cost considerations, then it would be expected for additional vertically extending rows of stitching 12 to be placed at a spaced-apart distance from the side edges of front pouch panel 4a and adjacent to the opposite ends of front magnetic strip 16a to restrict its lateral movement for optimal engagement with opposing back magnetic strip 16b, which would also be restricted in lateral movement by similar stitching 12. In addition, in FIG. 2, stitching 12 is shown in two places on back pouch panel 4b, to assist in sealing hidden elongated back magnetic strip 16b within a hemmed enclosure or pocket adjacent to top back edge 8b, and to seal hidden handbag frame back member 18b within a hemmed enclosure or pocket adjacent to bottom back edge 10b, and unless otherwise restricted by additional stitching (not shown), elongated back magnetic strip 16b and handbag frame back member 18b would be able to slide freely within its respective hemmed enclosure/pocket. Depending upon the order of the construction steps used during manufacture of first preferred embodiment 2 and whether stitching 12 is applied prior to or following the joining of longitudinal seams 28 shown in FIG. 7, the stitching 12 employed adjacent to front top edge 8a and top back edge 8b could comprise a continuous filament of thread, or be independently applied prior to the joining of front pouch panel 4a to back pouch panel 4b. Similarly, the stitching 12 employed adjacent to bottom front edge 10a and bottom back edge 10b could comprise a continuous filament of thread, or be independently applied prior to the joining of front pouch panel 4a to back pouch panel 4b. Although not shown, additional stitching 12 could be optionally applied as top stitching, adjacent to front top edge 8a and top back edge 8b, as well as bottom front edge 10a and bottom back edge 10b, to further restrict movement of elongated front magnetic strip 16a, elongated back magnetic strip 16b, handbag frame front member 18a, and handbag frame back member 18b within their respective hemmed enclosures, or for use as decorative accent. Also, although not shown, stitching 12 would be preferably used to laterally join front pouch panel 4a to back pouch panel 4b at seam line 28 as shown in FIG. 7. Additional stitching 12 used in a top-stitched position can optionally be employed on or adjacent to the longitudinal seam line 28 shown in FIG. 7 to add strength to the seams 28 joining front pouch panel 4a to back pouch panel 4b in first preferred embodiment 2. Depending upon whether the manufacturing step of using stitching 12 to form the hemmed enclosures or pockets in the opposing ends of front pouch panel 4a and back pouch panel 4b is performed prior to that of joining front pouch panel 4a to back pouch panel 4b at their respective lateral edges, apertures can be left in the hemmed enclosures or pockets, on the inside of the pouch, between front pouch panel 4a and back pouch panel 4b for the insertion of elongated front magnetic strip 16a, elongated back magnetic strip 16b, handbag frame front member 18a, and handbag frame back member 18b, as well as the end-to-end connection of handbag frame front member 18a to handbag frame back member 18b with hinges 20 on each of their respective ends. Also, although not shown, once the respective closure structures are in place, stitching 12 can be optionally used to seal such apertures, if desired. Otherwise, apertures (not shown) can remain so that the closure structures of elongated front magnetic strip 16a, elongated back magnetic strip 16b, handbag frame front member 18a, and handbag frame back member 18b can be readily removed for desired laundering of front pouch panel 4a and back pouch panel 4b. Although handbag frame front member 18a and handbag frame back member 18b are used to close the lower end of the pouch 4 formed by lateral connection of front pouch panel 4a to back pouch panel 4b, other types of easily opening lower end closure are also considered within the scope of the present invention, such as but not limited to the buttons 62 and frogs 64 shown in FIGS. 14 and 15, the buttons 62 and buttonholes 66 shown in FIG. 16, the two-part snaps 68a and 68b shown in FIG. 17, the hook-and-pile types of fasteners with hook members 70a and pile members 70b shown in FIG. 18, the zipper 72 shown in FIG. 19, or opposing magnets, such as elongated front magnetic strip 16a and elongated back magnetic strip 16b, as shown in FIGS. 1 and 2, or several pairs of smaller magnets 60, as shown in FIG. 14. A greater or lesser number of end closures than is shown in FIGS. 1, 2, 14, 16, 17, and 18 can be used to secure bottom front edge 10a to bottom back edge 10b, as long as a sufficient number are present for successful collected lint 46 containment, and the number used does not involve unneeded expense. Combinations of different end closures can be optionally used for securing the upper or lower ends of front pouch panel 4a and back pouch panel 4b to one another for aesthetic/design purposes, as long as the combination used retains the ability for being readily opened and closed.

FIGS. 1 and 2 also show mitt 14 having two opposed thumb members, identified by the number 22 in FIG. 3. Although two opposed thumb members 22 are preferred for immediate left-handed and right-handed use without accommodation, it is also considered within the scope of the present invention for mitt 14 to have only one thumb member 22, or no thumb members 22. Further when one or two opposed thumb members 22 are used, the person employing it for removal of accumulated lint, such as lint 46 in FIGS. 9 and 10, as shown in FIG. 8, can place a thumb on hand 44 in one thumb member 22, with the remaining fingers on hand 44 all being positioned together within the finger containing member of mitt 14, shown by the number 24 in FIG. 3, or in the alternative the smallest finger may be positioned within the remaining thumb member 22 (not shown). Although not shown in FIGS. 1 and 2, it is also contemplated for the open end of mitt 14, shown in FIG. 3 by the number 32, to be attached to front pouch panel 4a by a threaded connection similar to stitching 12 in FIGS. 1 and 2, with the combined cut edges of mitt 14 and opening 6 being positioned within the interior of the pouch formed by the joining of front pouch panel 4a to back pouch panel 4b when mitt 14 is in a ready-to-use configuration. Although opening 6 is shown having an elongated configuration with rounded ends, such a configuration is not critical to first embodiment 2, and it is also contemplated for the configuration of opening 6 to have other configurations, such as but not limited to that of an ellipse, rectangle, or circle. Manufacturing considerations as to the labor cost in cutting opening 6 through front pouch panel 4a and stitching mitt 14 to opening 6 would affect the choice of configuration used for opening 6. FIG. 1 also shows opening 6 positioned longitudinally approximately one-half the distance between the center of front pouch panel 4a and the stitching 12 adjacent to front top edge 8a. Also, although such longitudinal positioning of opening 6 on front pouch panel 4a is preferred, it is not critical to the present invention and opening 6 might be differently positioned for embodiments having a longer front pouch panel 4a, as well as those having a larger lint-holding capacity. For example, an embodiment with a longer front pouch panel 4a could have a longitudinally centered opening 6, elongated front magnetic strips 16a and elongated back magnetic strips 16b securing both the upper and lower ends of front pouch panel 4a and back pouch panel 4b to one another, and a mitt 14 with a single thumb secured to opening 6 whereby front pouch panel 4a and back pouch panel 4b can be stored in an upright or inverted position for use, depending upon whether the person employing the present invention for lint removal would prefer right-handed or left-handed use. FIGS. 1 and 2 shows front pouch panel 4a and back pouch panel 4b each having a substantially rectangular configuration. Although not limited thereto, a rectangular configuration is preferred so that the inside surfaces of front pouch panel 4a and back pouch panel 4b do not impede the downward movement of lint 46 toward lower front end 10a and lower front end 10b. A rectangular configuration, instead of a tapering configuration, also facilitates employment of the present invention in upright or inverted positions for equally effective right-handed and left-handed use. Further, FIGS. 1 and 2 shows front pouch panel 4a and back pouch panel 4b having substantially the same length and width dimensions. However, it is also contemplated for back pouch panel 4b to be longer in length dimension than front pouch panel 4a, depending on bottom closure means used, such as those illustrated in FIGS. 14–18. Although both front pouch panel 4a and back pouch panel 4b, as well as mitt 14, could be made from many types of material or fabric, and have linings (not shown) if needed, in first preferred embodiment 2 it is preferred that front pouch panel 4a, back pouch panel 4b, and mitt 14 be made from washable materials or fabrics. In the most preferred embodiment of the present invention, mitt 14 would be made from a soft, stretchable, knitted, lint-adhering cotton fabric, and front pouch panel 4a, and back pouch panel 4b would each be made from a fabric with a slick, non-adhering surface, such as nylon, to which lint 46 would not easily become affixed.

Use of first preferred embodiment 2 for rapid, thorough, efficient, and neat removal of lint 46 from a clothes dryer filter 50, would involve placement of a hand, such as hand 44 in FIG. 8, through opening 6 and into mitt 14. Typically, all of the fingers of hand 44 would be placed into finger containing member 24 and the thumb of hand 44 would be placed into one of the thumb members 22 of mitt 14. If first preferred embodiment 2 is attached to the housing of a clothes dryer, such as dryer 52 in FIG. 12 or 13, back pouch panel 4b could be removed from dryer 52 prior to insertion of hand 44 into mitt 14, or after insertion of hand 44 into mitt 14 at the user's preference. Once hand 44 is positioned within mitt 14, front top edge 8a is separated from top back edge 8b to place the upper end of first preferred embodiment 2 in an opened position so that mitt 14 can be extended beyond front top edge 8a and top back edge 8b for collection of lint 46, as shown in FIG. 8. As shown in FIGS. 1 and 2, the two-part magnetic closure means 16, comprised of elongated front magnetic strip 16a and elongated back magnetic strip 16b, in the upper end of first preferred embodiment 2 allows for easy opening of the upper end, rapid mitt 14 extension, and uninhibited prompt gathering of lint 46. The fingers of hand 44, when inside mitt 14, would stretch a mitt 14 made from stretchable fabric as hand 44 is bent to gather lint 46 to remove it from lint filter 50, further assisting the protruding ridge-like bound seam 26 in the gathering of lint 46 without fragmentation. Once mitt 14 is withdrawn back between front pouch panel 4a and back pouch panel 4b, the magnetic closure means 16 can be quickly used to seal the pouch made from front pouch panel 4a and back pouch panel 4b, and prevent dispersal of lint 46 while the pouch is being transported back to its storage position against the outer surface of a clothes dryer housing 52, where it can remain conveniently situated for subsequent uses. If the size of the magnets 16a and 16b used for upper end closure is adequate to uphold the weight of front pouch panel 4a, back pouch panel 4b, mitt 14, and lint 46, magnets 16a and 16b can also provide the means for attachment of the pouch to dryer 52. Should smaller closure magnets, such as small magnets 60 in FIG. 14, be desired for closure of the upper end, or a larger pouch be desired for commercial or large resident facility use, one or more additional magnets 16c can be added to back pouch panel 4b, as shown in FIG. 2. The lint holding capacity of the pouch would be adequate for multiple lint filter 50 cleanings in the contemplated application, before emptying is required. Assuming three to five loads of laundry are washed and dried every day in a household laundry room or small apartment laundry facility, it is contemplated that the lint holding capacity of first preferred embodiment 2 would be sufficiently large for the accumulated lint 46 typically left behind in a dryer filter, such as dryer filter 50 in FIG. 11, over a minimum period of two to three days. For busier laundry facilities, lint holding capacity may be sufficient for pouch emptying only once or twice in a day. To empty the pouch formed from front pouch panel 4a and back pouch panel 4b and dispose of accumulated lint 46, with its upper and lower ends in closed positions the present invention would be transported to an appropriate waste container 48 in a location remote from dryer 52. Once positioned immediately above the wide upper opening of a waste container 48, the lower end of the pouch would simply be opened to let gravity do most of the work in causing the downward release of lint 46 into waste container 48. Should any lint 46 remain in the pouch after initial opening of the lower end, the pouch can be gently shaken to separate any residual lint 46 from the pouch. In this way the placement of lint 46 into an open waste container (not shown) adjacent to dryer 52 is avoided, a practice that only allows for more of the finer fragments of lint 46 to become dispersed into the air surrounding dryer 52 each time a new quantity of lint 46 or other discarded objects (not shown) are added to the container, promoting the risk of fire hazard in and around dryer 52 instead of reducing it. Once the desired amount of lint 46 is removed from the pouch, the lower end of the pouch can again be placed into its closed position and transported back to dryer 52 whereby the pouch can then be reattached to the housing of dryer 52 in an orientation easily accessible for future use. A variety of easily-opened closure means are contemplated for the lower end of the pouch formed from front pouch panel 4a and back pouch panel 4b, such as but not limited to buttons 62 as shown in FIGS. 14 and 16, large snaps 68 as shown in FIG. 17, hook and pile types of fasteners 70 as shown in FIG. 18, magnets 16 or 60 similar to that shown in FIGS. 1 and 14 respectively, a zipper 72 as shown in FIG. 19, a spring-biased two-part handbag frame style of closure 78 as shown in FIGS. 1 and 2, crocheted frogs 64 as shown in FIGS. 14 and 15, and any combination thereof. Some of the preferred embodiments of the present invention require that back pouch panel 4b be slightly longer than front pouch panel 4a, so that back pouch panel 4b folds up over the bottom portion of front pouch panel 4a during closure for successful lint containment. It is preferred that front pouch panel 4a and back pouch panel 4b be manufactured from a lightweight durable material, such as nylon, so that the pouch formed therefrom, as well as attached mitt 14 and a maximum contemplated quantity of accumulated lint 46, can easily be supported by magnets 16 or 60 against the outer surface of a dryer housing 52. It is also preferred that the pouch made from front pouch panel 4a and back pouch panel 4b be constructed from a material with a slick surface to which accumulated lint 46 does not readily adhere. Further, although not critical, it is preferred that the pouch and mitt 14 be made from washable materials, and that mitt 14 be manufactured from soft, lint-adhering, stretchable, knit material. Although not shown, it is considered within the scope of the present invention for the pouch made from front pouch panel 4a and back pouch panel 4b to have a lining when a pouch fabric is chosen for its surface decoration instead of its functional advantages. However, a lining is generally not preferred where the added weight of a lining would increase the cost of magnetic support. Since the preferred embodiments of the present invention have few parts to assemble, and different bottom closures are contemplated to accommodate user preference and price point considerations, the present invention can be cost effectively manufactured for different targeted markets and widespread use.

Although the dimensions of components in the present invention could vary and should not be limited hereto, the following dimensions are provided as an example of some of the dimensions more commonly used in the most preferred embodiment. It is contemplated for front pouch panel 4a and back pouch panel 4b in present invention 2 to each have a stitched length dimension of approximately sixteen inches, and a stitched width dimension of approximately eleven inches. The side seams 28 between front pouch panel 4a and back pouch panel 4b would typically have a width dimension between one-half inch and three-fourths of an inch. In the alternative, when one large piece of fabric having the combined dimension of front pouch panel 4a and back pouch panel 4b is used to form the needed pouch, a single longitudinal seam 28 would be used instead of opposing side seams 28. The horizontally extending stitching 12 adjacent to front bottom edge 10a and back bottom edge 10b would be at spaced-apart distances therefrom of approximately one inch. Also, the front handbag closure frame 18a and the back handbag closure frame 18b that are respectively placed in the enclosed pockets between front bottom edge 10a and stitching 12, and back bottom edge 10b and stitching 12, would have a maximum width dimension of approximately one-half inch. The horizontally extending stitching 12 adjacent to front top edge 8a and top back edge 8b would be at spaced-apart distances therefrom of approximately one-and-one-half inches. Also, the elongated front magnetic strip 16a and the elongated back magnetic strip 16b that are respectively placed in the enclosed pockets between front top edge 8a and stitching 12, and top back edge 8b and stitching 12, would have a maximum width dimension of approximately one inch. In place of elongated front magnetic strip 16a and elongated back magnetic strip 16b, the closure means for securing front top edge 8a to top back edge 8b could comprise six disk-shaped magnets, such as those shown in FIG. 14 by the number 60, each having the cross-sectional configuration of a circle with an approximate diameter dimension between three-fourths of an inch and one inch, as well as a thickness dimension of approximately one-fourth of an inch. Two opposing sets of the disk-shaped magnets 60 would be placed approximately one-and-one-fourth inches to one-and-one-half inches from the side seams connecting front pouch panel 4a to back pouch panel 4b, with the third set of disk-shaped magnets 60 being approximately centered between the side seams 28 connecting front pouch panel 4a to back pouch panel 4b. Although not shown, magnets having other cross-sectional configurations could also be used. Further, opening 6 would be approximately five inches in length, with approximately three inches of front pouch panel 4a present on both sides of opening 6. Also, in the most preferred embodiment, opening 6 would be positioned between approximately one inch and three inches from the horizontally extending stitching 12 adjacent to front top edge 8a. In addition, for most purposes mitt 14 would have a maximum length dimension of approximately eight inches to nine inches, with thumb members 22 extending to an approximate maximum distance of five inches from opening 6. Also in the most preferred embodiment finger-containing member 24 would have a non-stretched width dimension of approximately four-and-one-half inches.

Figure 11:
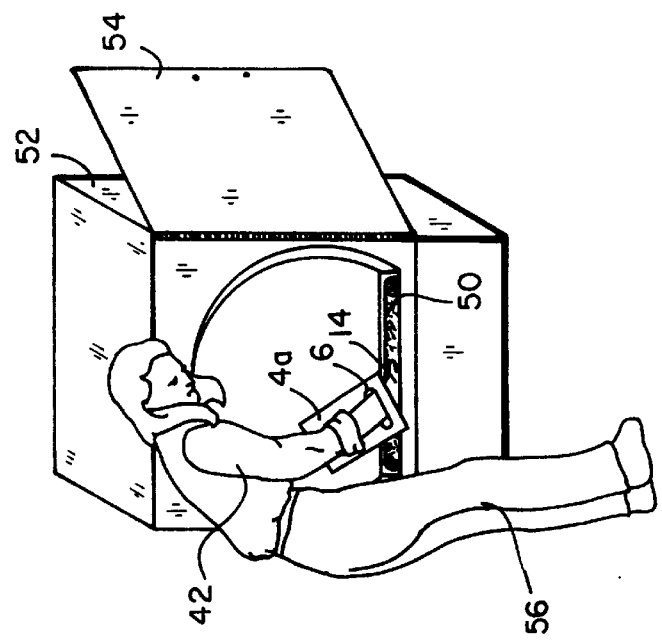
FIG. 11 is a perspective view of a person using the fully manufactured first preferred embodiment to collect accumulated lint from a clothes dryer lint filter.

FIG. 3 shows mitt 14 of first preferred embodiment 2 of the present invention having two opposed thumb members 22 and a central finger containing member 24 therebetween for use in covering the three middle fingers of the hand 44 shown in FIG. 8, or all four fingers of the person using it to remove lint 46 from a dryer lint filter 50, such as is shown in FIGS. 8 and 11. Although FIG. 3 shows two thumb members 22, it is also considered to be within the scope of the present invention for mitt 14 to have only one thumb member 22, or no thumb members 22 and only a large finger containing member 24 for the entire hand 44 shown in FIG. 8. FIG. 3 also shows mitt 14 having a bottom opening 32, an inside surface 30, seam lines 28, and a ridge-like bound seam 26 on its entire perimeter edge except for that surrounding bottom opening 32. It is through seam line 28 that mitt 14 becomes attached to opening 6 during manufacture of the present invention. Although such construction is not critical, bound seam 26 in first preferred embodiment 2 would contain the cut edges of two opposing pieces of soft, stretchable, lint-attracting knit fabric, such as cotton, overcast or bound with thread, the detail of which is not shown in FIG. 3. Although not limited thereto and not shown, and provided herein as only one example of use, a buttonhole stitch could be used to secure the cut edges of bound seam 26 so that it is sufficiently bulky and upstanding to form a ridge and be effective, as well as efficient, in gathering accumulated lint 46 from the lint filter 50 of a clothes dryer 52 and rolling it into an accumulated mass with little or no fragmentation. During such gathering of lint 46, it is expected that hand 44 inserted into mitt 14, as shown in FIG. 8, would stretch mitt 14 as the fingers on hand 44 fold around lint 46 to help contain it during transport. Further, and although not limited thereto, it is contemplated for protruding ridge-like bound seam 26 to have a preferred minimum width dimension of approximately one-eight of an inch, and a preferred maximum width dimension of approximately one-fourth of an inch. Opposed thumb members 22 allow for immediate left-handed and right-handed use without accommodation, although immediate left-handed and right-handed use can also be achieved with a longer rectangular pouch, mitt 14 with one or no thumb members 22, and a longitudinally centered opening 6 that in combination allow for equally convenient upright and inverted positioning of front pouch panel 4a and back pouch panel 4b, allowing its user the choice of preferred orientation. Since mitt 14 is directly attached to opening 6, the removed dryer lint 46 can be immediately transferred to the pouch formed from back pouch panel 4b and front pouch panel 4a after its collection, while mitt 14 is closely positioned to the clothes dryer filter 50. Thus, there would be no uncovered transport of fragmented particles of lint 46 to a remote waste container, such as waste container 48 shown in FIG. 11, that otherwise tends to result in the dispersal of at least a portion of dry, wispy, lightweight lint 46 into the area immediately surrounding a clothes dryer 52. Further, although not critical, when mitt 14 is manufactured from soft, lint-adhering material, the ridge-like bound seam 26 of mitt 14 tends to roll lint 46 into a compact mass as mitt 14 is drawn across a clothes dryer filter 50, instead of buckling and/or fractionating portions of the accumulated lint 46 into easily dispersed fragments, as tends to happen when uncovered fingernails and fingertips are used to separate lint 46 from filter 50. Also, since the fingernails of the person removing lint 46 are covered by mitt 14 when preferred embodiment 2 is used, fingernails do not come in direct contact with filter 50 and are not placed at risk for damage. In addition, any fragments of lint 46 dislodged from filter 50 while the bulk of lint 46 is being rolled into a compact mass, would tend to be immediately attracted to the soft material of mitt 14 and cling to it, minimizing the amount of lint 46 becoming dispersed as a fine dust into the air immediately surrounding dryer 52. When a clothes dryer lint filter 50 is regularly cleaned, the present invention mitt 14 tends to remove nearly all of the accumulated lint 46 thereon in one pass of mitt 14 across filter 50. Multiple passes of mitt 14 are only anticipated for an unusually heavy deposit of lint 46, such as that expected during the laundering of new towels or blankets (not shown).

Figure 12:
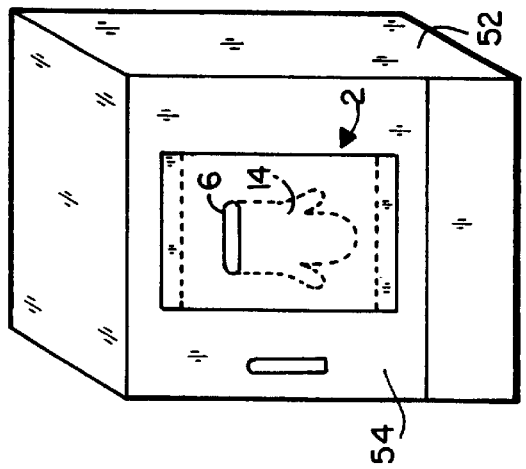
FIG. 12 is a perspective view of the fully manufactured first preferred embodiment attached to the door of a clothes dryer housing with the mitt being shown in broken lines within the pouch in its typical stored position.

FIG. 4 shows one possible configuration of the magnetic strips 16a and 16b, as well as additional magnetic strips 16c, used in first preferred embodiment 2. Magnetic strips 16 similar to that shown in FIG. 4 can be used to close front top edge 8a against top back edge 8b, as shown by 16a and 16b in FIGS. 1 and 2. A magnetic strip 16 similar to that shown in FIG. 4 can also be attached to the outside surface of back pouch panel 4b, as shown in FIG. 2 by the number 16c, to help attach first preferred embodiment 2 to the outside surface of a dryer 52, as shown in FIG. 11, or to the door 54 of a dryer 52, as shown in FIG. 12. The length, width, and thickness dimensions of magnetic strip 16 is not critical, and would vary according to the weight of the material used for front pouch panel 4a, back pouch panel 4b, and mitt 14, as well and the lint-holding capacity of front pouch panel 4a and back pouch panel 4b when joined together and sealed at upper and lower ends with easily opening closures, such as handbag frame front member 18a and handbag frame back member 18b. However, as the size of magnetic strip 16 employed during manufacture is increased, it must be taken into consideration that the manufacturing cost is also increased. Although not limited thereto, magnetic strips 16 made from ferromagnetic materials are preferred, due to their inexpensive cost and widespread availability.

Figure 5:
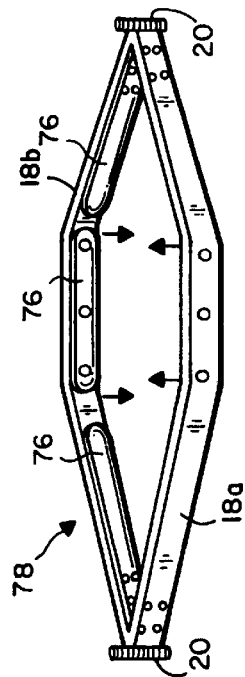
FIG. 5 is a perspective view of a two-part handbag frame style closure means for sealing and securing the bottom end of the lint storage pouch of the first preferred embodiment.

FIG. 5 shows the two-part handbag frame style closure 78 used in first preferred embodiment 2 for closing back bottom edge 10b against front bottom edge 10a. In the alternative, lower end closures can include but are not limited to those shown in FIGS. 14–19, or magnetic closures such as the smaller disk-like magnets 60 shown in FIG. 14 for upper end closure, or the magnetic strips 16a and 16b shown in FIGS. 1 and 2 as upper end closures. FIG. 5 shows two-part handbag frame style closure 78 having an elongated handbag frame back member 18b, an elongated handbag frame front member 18a, two hinges 20 with a different hinge 20 connecting handbag frame back member 18b to handbag frame front member 18a on each of their respective ends, and several inner support members 76 used to prevent inadvertent crimping or creasing of the flexible material from which handbag frame back member 18b and handbag frame front member 18a are manufactured, and any resulting interference from such crimping or creasing that might otherwise prevent their proper operation. When handbag frame back member 18b is connected to handbag frame front member 18a with hinges 20, handbag frame back member 18b and handbag frame front member 18a are each movable relative to the other between at least one openable position and a fully closed position, each being normally biased into the closed position. However, when handbag frame front member 18a is forced away from handbag frame back member 18b, both can remain separated from the other until an outside closing force is applied to handbag frame front member 18a, handbag frame back member 18b, or both. At least one intermediate opened position is also possible between handbag frame front member 18a and handbag frame back member 18, although not considered critical. When handbag frame front member 18a and handbag frame back member 18b are inserted within the lower pockets formed in front pouch member 4a and back pouch member 4b, respectively, it is contemplated that apertures (not shown) can remain in the lower pockets after manufacture, adjacent to hinges 20, so that hinges 20 can be disassembled for the removal of handbag frame front member 18a and handbag frame back member 18b from front pouch member 4a, back pouch member 4b, and mitt 14, prior to laundering.

Figure 6:
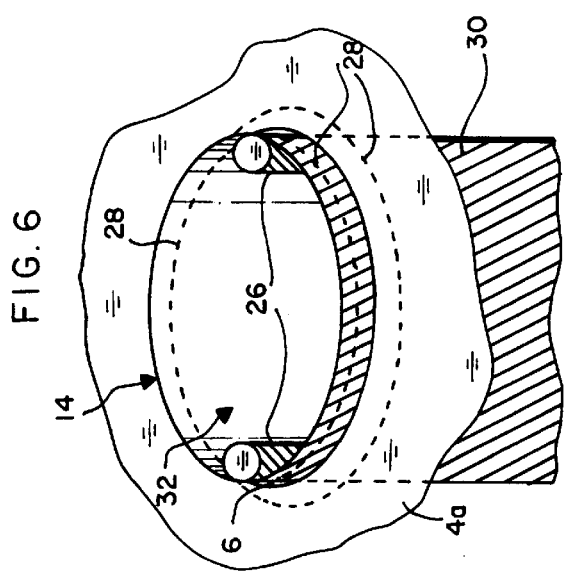
FIG. 6 is a perspective view of the mitt of the first preferred embodiment inserted within an opening in the front panel of the lint storage pouch and ready for stitched attachment to the front panel.

FIGS. 6 and 7 show the positioning of mitt 14 immediately prior to attachment of mitt 14 to the opening 6 in front pouch panel 4a. If the cut edges of the material from which mitt 14 is manufactured are subject to easy unraveling or fray, mitt 14 can be turned inside-out so that bound seam 26 is located in a reversed position where it will remain between front pouch panel 4a and back pouch panel 4b during use. For ease of manufacture, it is contemplated for mitt 14 to be connected to front pouch panel 4a, prior to front pouch panel 4a being attached to back pouch panel 4b at side seams 28. However, it is optional whether side seam lines 28 in front pouch panel 4a and back pouch panel 4b would be connected prior to, or after, the forming of end pockets via the folding and stitching of top cut edge 36 and bottom cut edge 38 against adjacent portions of front pouch panel 4a and back pouch panel 4b. FIG. 6 provides an enlarged view of opening 6 and the open end 32 of mitt 14, with opposing protruding bound seams 26 facing one another. Both FIG. 6 and FIG. 7 show opening 6 having a more circular perimeter dimension than previously shown in FIG. 1, the configuration of opening 6 being a function, labor cost, or design consideration, or combination of several such considerations. FIGS. 6 and 7 also both show seam lines 28 around opening 6 and on mitt 14 adjacent to its open end 32, being aligned for later connection with stitching, such as stitching 12 shown in FIGS. 1 and 2. FIG. 7 further shows the front pouch panel 4a of first embodiment 2 prior to folding and stitching. As shown by the uppermost unnumbered arrow, top cut edge 36 can be folded at fold line 34, then folded again at front top edge 8a prior to being secured in place with stitching 12 (not shown in FIG. 7, but shown in FIG. 1) to form a hemmed enclosure or pocket for elongated front magnetic strip 16a. Stitching 12 can be attached with either the front surface or the back surface of front pouch panel 4a facing in an upward position. Similarly, and as shown by an opposing unnumbered lower arrow, bottom cut edge 38 can be folded at fold line 34, then folded again at front bottom edge 10a prior to being secured in place with stitching 12 (not shown in FIG. 7, but shown in FIG. 1) to form a hemmed enclosure or pocket for elongated back magnetic strip 16b. If the type of stitching 12 used is configured to encase top cut edge 36 and bottom cut edge 38 to prevent fraying thereof, the step of folding at top and bottom fold lines 34 can be omitted during the formation of hemmed enclosures or pockets for elongated front magnetic strip 16a and elongated back magnetic strip 16b, thus saving some material expense. FIG. 7 further shows the side cut edges 40 of front pouch panel 4a, as well as the side seam lines 28 used for connecting front pouch panel 4a to back pouch panel 4b. Once front pouch panel 4a is connected to back pouch panel 4b at side seam lines 28, the cut edges 40 of fabric adjacent to seam lines 28 in either or both front pouch panel 4a and back pouch panel 4b can be bound to prevent unraveling or fray, or if subject to fray the type of stitching 12 used to connect seam lines 28 in FIG. 7 can be selected so that side cut edges 40 become overcast by stitching 12 as stitching 12 is applied. The number 30 in both FIGS. 6 and 7 identifies the lines indicating the back fabric surfaces of both mitt 14 and front pouch panel 4a. Thus, as, shown in FIGS. 6 and 7, when hand 44 is placed within mitt 14, hand 44 would come into contact with the back fabric surface of mitt 14, while the front fabric surface of mitt 14 would be used to collect lint 46, and protruding bound seam 26 if present would be formed into the front surface of mitt 14. It is also contemplated for the reverse to be within the scope of the present invention, so that when the back fabric surface 30 of the material used to make mitt 14 is more lint-adhering and suitable for collection of lint 46, mitt 14 can be attached to front pouch panel 4a so that the back fabric surface 30 of mitt 14 is used for lint collection and the front fabric surface of the material used to make mitt 14 would be the fabric surface in direct contact with hand 44. FIG. 7 shows the protruding bound seam 26 of mitt 14 positioned inside mitt 14 during the connection of mitt 14 to front pouch panel 4a. However, reverse positioning of mitt 14 is also considered to be within the scope of the present invention. Once attachment of mitt 14 to front pouch panel 4a is complete, mitt 14 would be pushed through opening 6 against the back fabric surface 30 of front pouch panel 4a for use, wherein the lint-gathering bound seam 26 of mitt 14, if present for use as an additional lint gathering means, would be in an exposed position ready for service.

FIGS. 8, 9 and 10 show mitt 14 in first preferred embodiment 2, respectively, in a position extending beyond front top edge 8a and top back edge 8b for the collection of dryer lint 46, in a position drawn back below front top edge 8a for release of lint 46 into the pouch formed from front pouch panel 4a and back pouch panel 4b, and in a downwardly facing non-active position while front bottom edge 10a is separated from back bottom edge 10b to allow transfer of lint 46 to a separate waste disposal container 48 remote from dryer 52. FIG. 8 shows a human arm 42 inserted through opening 6, with the hand 44 connected thereto positioned within mitt 14. Although all four fingers on hand 44 are positioned within the central finger containing member of mitt 14, identified by the number 24 in FIG. 3, and the thumb on hand 44 is placed within one of the thumb members 22 of mitt 14, identified by the number 22 in FIG. 3, mitt 14 could also be used with the thumb on hand 44 positioned within finger containing member 24 with the fingers on hand 44, or with at least one of the fingers on hand 44 placed into the thumb member 22 shown unused in FIG. 8. The use of second thumb member 22 would therefore remain a choice of the user, and probably would be preferred only by those having larger hands. Horizontally extending stitching 12 adjacent to front top edge 8a and top back edge 8, as well as adjacent to front bottom edge 10a and back bottom edge 10b, helps to keep the potentially unraveling top and bottom cut edges 36 and 38 of front pouch panel 4a and back pouch panel 4b from interfering with the extension and withdrawal of mitt 14, or interfering with the downward movement of lint 46 once front bottom edge 10a and back bottom edge 10b are separated from one another, during repeated use of first preferred embodiment 2. Although not critical, during the extension of mitt 14 beyond front top edge 8a and top back edge 8, as well as during use of mitt 14 to collect lint 46, it is contemplated that front bottom edge 10a and back bottom edge 10b would remain secured tightly against one another. FIG. 9 shows mitt 14 after lint collection, and when mitt 14 is already withdrawn below front top edge 8a and top back edge 8b, in a downwardly hanging position between front pouch panel 4a and back pouch panel 4b. Arm 42 is still inserted through opening 6, with mitt 14 having a substantially open and planar configuration that allows collected lint 46 to fall into the bottom of the pouch created by the joining of front pouch panel 4a and back pouch panel 4b. When hand 44 is still within mitt 14 and lint 46 is being transferred from mitt 14 to the interior space between front pouch panel 4a and back pouch panel 4b, it is contemplated for front top edge 8a to be in either an opened position, or a closed position against top back edge 8b and secured thereto by elongated front magnetic strip 16a being firmly positioned against elongated back magnetic strip 16b (not shown in FIG. 9). However, front bottom edge 10a would necessarily be in a closed position against back bottom edge 10b to keep collected lint 46 between front pouch panel 4a and back pouch panel 4b. To empty lint 46 from first preferred embodiment 2, FIG. 10 shows first preferred embodiment 2 positioned above a waste container 48 having a wide top opening, with handbag frame front member 18a separated from handbag frame back member 18b so as to maintain front bottom edge 10a and back bottom edge 10b in positions separated from one another. Although front top edge 8a would usually be in a closed position against top back edge 8b, secured together by elongated front magnetic member 16a and elongated back magnetic member 16b (not shown in FIG. 10), such closure is not critical. If magnetic closures 16 were used to secure the bottom edges of front pouch panel 4a and bottom pouch panel 4b to one another in place of handbag frame front member 18a separated from handbag frame back member 18b, the person removing lint 46 would probably hold front pouch panel 4a and bottom pouch panel 4b adjacent to front bottom edge 10a and back bottom edge 10b to maintain handbag frame front member 18a in a separated position from handbag frame back member 18b until the gravity-assisted lint emptying process was complete. FIG. 10 shows the horizontally extending stitching 12 that helps to form the enclosures or pockets within front pouch panel 4a and back pouch panel 4b for handbag frame front member 18a, handbag frame back member 18b, elongated front magnetic member 16a and elongated back magnetic member 16b (not shown in FIG. 10). After all collected and temporarily stored lint 46 is emptied from first preferred embodiment 2 into waste container 48, front bottom edge 10a can be again placed in a closed position against back bottom edge 10b, and first preferred embodiment 2 attached to the housing of a clothes dryer, such as clothes dryer 52 shown in FIGS. 11–13, so that it can remain readily accessible for subsequent uses.

Figure 13:
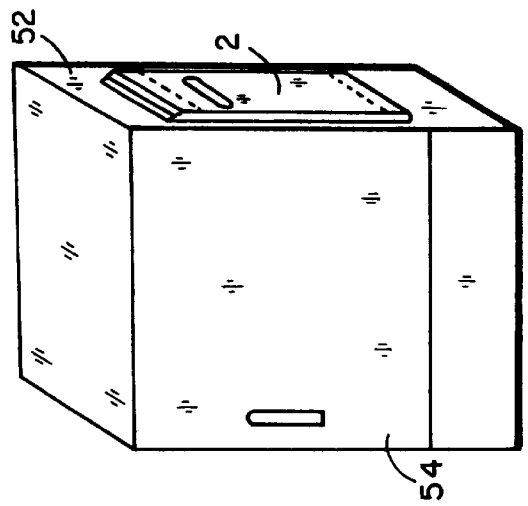
FIG. 13 is a perspective view of the fully manufactured first preferred embodiment attached to the outside surface of a clothes dryer in a position that is easily accessible for use.

FIG. 11 shows a person 56 using mitt 14 to clean a clothes dryer filter 50, while FIGS. 12 and 13 show first preferred embodiment 2 being conveniently stored in a position attached to the outer surface of clothes dryer 52. Although not limited thereto, first preferred embodiment 2 would be attached to clothes dryer 52 so that opening 6 faces away from clothes dryer 52, making it easy for person 56 shown in FIG. 11 to rapidly insert hand 44 into mitt 14 even before preferred embodiment 2 is separated from clothes dryer 52 for use. FIG. 11 shows person 56 having one arm 42 inserted through opening 6 in front pouch panel 4a, and mitt 14 extended beyond one end of front pouch panel 4a. While bending over to access lint filter 50, with filter 50 remaining in its usable position within clothes dryer 52, person 56 employs mitt 14 to easily and quickly gather the lint 46 (not shown in FIG. 11) that has collected upon filter 50 during use of clothes dryer 52. In some instances the collecting surface of lint filter 50 is only accessible by removing filter 50 from clothes dryer 52. However, when lint 46 can be removed with lint filter 50 remaining in its usable position, it would be the choice of the person 56 attempting to remove lint 46 as to whether to separate lint filter 50 from clothes dryer 52 prior to the lint filter 50 cleaning process. Typically, one pass of mitt 14 over the lint collecting surface of filter 50 is sufficient for removal of lint 46 from filter 50, due to the soft material used to make mitt 14 which causes fragments of lint 46 to be attracted to mitt 14 and adhere to it during the lint removal process, as well as the effectiveness of ridge-like bound seam 26 (shown in FIG. 3) on mitt 14 being able to roll lint 46 into a compact mass when a bound seam 26 is used. FIG. 12 shows first preferred embodiment 2 being attached to a dryer door 54, and FIG. 13 shows first preferred embodiment 2 being attached to the right side of a clothes dryer housing 52, both in positions readily accessible for convenient use by person 56. Although not shown, first preferred embodiment 2 could also be attached to the left side of dryer housing 52, or placed upon the top of dryer housing 52. Thus, when person 56 approaches clothes dryer 52 with the intent of removing lint 46 from filter 50, person 56 can optionally grip first preferred embodiment 2 with one or two hands, separate first preferred embodiment 2 from clothes dryer 52, and then insert one arm 42 through opening 6, followed by separation of the top edges 8a and 8b of front pouch panel 4a and back pouch panel 4b from one another, and extension of mitt 14 beyond front top edge 8a and top back edge 8 to prepare mitt 14 for lint collection use. In the alternative, and in a more efficiently flowing motion, it is also contemplated for person 56 to use the attachment of first preferred embodiment 2 to clothes dryer 52 as an anchoring point to steady first preferred embodiment 2 while arm 42 is inserted through opening 6, after which first preferred embodiment 2 would be separated from clothes dryer 52, separation of the top edges 8a and 8b of front pouch panel 4a and back pouch panel 4b from one another, and mitt 14 being extended into an exposed position for use.

FIGS. 14–19 show examples of some of the various alternative closures also contemplated for use in securing front bottom edge 10a to back bottom edge 10b. However, the means used to secure front pouch panel 4a to back pouch panel 4b are not limited to that shown in FIGS. 1–2, 4–5, and 9–19, and can include any number of easily opened, secure multiple-part fasteners or combination thereof. FIG. 14 shows a second preferred embodiment 58 of the present invention having a bottom closure consisting of several buttons 62 and several crocheted frogs 64. Also, the top closure of second preferred embodiment 58 consists of several small magnets 60, instead of opposing elongated magnetic strips 16. In many of the embodiments shown in FIG. 14–19, back pouch panel 4b is slightly longer than front pouch panel 4a, to allow back pouch panel 4b to fold over the bottom portion of front pouch panel 4a to provide bottom pouch closure. Although not shown in FIGS. 16–18, one or more additional rows of horizontally extending stitching 12 could be placed adjacent to the juxtaposed bottom edges of front pouch panel 4a and back pouch panel 4b to further secure them after the present invention is turned inside-out following the application of stitching 12 to side seam lines 28. FIG. 15 shows an enlargement of one possible configuration of frog 64 having an enlarged upper loop 74 adapted to fit around the perimeter edge of the buttons 62 selected for use. Since frogs 64 are typically crocheted, upper loop 74 would be expected to exhibit some stretching capability. FIG. 16 shows a first alternative bottom closure contemplated for first preferred embodiment 2 and second preferred embodiment 58, consisting of several buttons 62 and buttonholes 66. FIG. 17 shows a second alternative bottom closure contemplated for first preferred embodiment 2 and second preferred embodiment 58, consisting of several two-part snaps, comprising snap members 68a and 68b. FIG. 18 shows a third alternative bottom closure contemplated for first preferred embodiment 2 and second preferred embodiment 58, consisting of several two-part rectangular-shaped fasteners each comprising a hook member 70a and a pile member 70b. The number, size and perimeter configuration of hook members 70a and pile members 70b is not critical as long as they provide for secure closure of front pouch panel 4a and back pouch panel 4b. However, in the most preferred embodiment of the present invention, hook members 70a would be attached to front pouch panel 4a and pile members 70b attached to back pouch panel 4b where they would not be in direct contact with lint 46, as downwardly moving lint 46 being emptied from front pouch panel 4a and back pouch panel 4b would have a greater likelihood of becoming attached to hook members 70a than pile members 70b. FIG. 19 shows a fourth alternative bottom closure contemplated for first preferred embodiment 2 and second preferred embodiment 58, consisting of a zipper 72 extending substantially the full width of front pouch panel 4a and back pouch panel 4b. Although in FIG. 19 the bottom end of back pouch panel 4b may appear to be longer than front pouch panel 4a, both have the same approximate length dimension and the curvature shown is for illustrative purposes only so that zipper 72 is not hidden from view. Although for maximum efficiency in emptying the pouch of collected lint 46, zipper 72 should extend substantially across front pouch panel 4a and back pouch panel 4b, such extension is not critical. Further, although not critical, for ease of installation it is generally preferred for zipper 72 to be attached between front pouch panel 4a and back pouch panel 4b prior to the joining of front pouch panel 4a to back pouch panel 4b at side seams 28.

Manufacture of the present invention is not limited to the joining of front pouch panel 4a to an equally dimensioned back panel 4b. In the alternative a single piece of material approximately twice the width of front pouch panel 4a and back pouch panel 4b can be utilized, with one longitudinally extending seam being formed, either as a side seam 28 or a back seam (not shown). For color contrast and other decorative interest, front pouch panel 4a could also be significantly narrower than back pouch panel 4b, with back pouch panel 4b wrapping around to create lateral portions of the present invention's front surface, whereby the two longitudinally extending seam lines 28 would be visible on either side of opening 6. Thus, a narrow front pouch panel 4a could be made from a fabric having a solid color, while back pouch panel 4b is made from a fabric having a flowered or other decorative pattern to give the front surface of the present invention a three-panel look. In the alternative, the solid color/decorative design contrast between front pouch panel 4a and back pouch panel 4b could also be reversed to present a three-panel look with a central panel having a flowered or other decorative design. Labor cost would be taken into consideration and compared to the marketing advantages of such designs. As a further alternative, it is also contemplated for the pouch of the present invention to be made from a tubular material requiring no longitudinally extending seams 28. If only one longitudinally extending seam is required, it would generally be preferred for the step of folding over and otherwise protecting the top cut edge 36 and the bottom cut edge 38 from unraveling or fraying to follow the step of creating the longitudinally extending seam 28.

What is claimed is:

1. A method for manufacturing a reusable clothes dryer lint removal device that allows thorough separation of accumulated lint from a clothes dryer lint filter, temporary storage of the removed lint, and efficient lint disposal, said method of manufacture comprising the steps of:
   providing a quantity of soft, lint-attracting material, a quantity of lightweight material to which clothes-dryer lint does not easily adhere, a plurality of two-part closure devices, at least one magnet, and a quantity of thread;
   using said soft, lint-attracting material to form a mitt component with a finger containing area and an opposed open end;
   using said lightweight material to form a tubular pouch having an interior, a top end, and a bottom end;
   forming a side opening through said lightweight material;
   using a portion of said thread to securely attach said open end of said mitt to said side opening to form a mitt/opening seam,;
   folding said top end of said pouch toward said interior to form an upper front pocket and an upper back pocket;
   using a portion of said thread to stitch and secure said upper front pocket and said upper back pocket in place;
   folding said bottom end of said pouch toward said interior to form a lower front pocket and a lower back pocket;
   using a portion of said thread to stitch and secure said lower front pocket and said lower back pocket in place;
   inserting a first part of at least one of said two-part closure devices into said upper front pocket;
   taking the corresponding second parts of each of said two-part closure devices used in said upper front pocket and inserting said second parts into said upper back pocket in positions opposed to said first parts that enable engagement between corresponding first and second parts of each of said upper closure devices used;
   securing a first part of at least one of said two-part closure devices to said lower front pocket; and
   taking the corresponding second parts of each of said two-part closure devices used in said lower front pocket and securing said second parts to said lower back pocket in positions opposed to said first parts that enable engagement between corresponding first and second parts of each of said lower closure devices used;
   whereby the resulting clothes dryer lint removal product can be used with an operator hand placed through said opening and into said mitt, and when said upper two-part closure devices are separated from one another and in opened positions said mitt can extend beyond said pouch to gather clothes dryer lint from a lint collection filter, the collected lint being deposited into said pouch for temporary storage as said mitt is withdrawn back into said pouch, and the lint being subsequently subjected to gravity-assisted removal from said pouch by independent opening of said lower two-part closure devices.

2. The product manufactured according to claim 1.

3. The method of claim 1 further comprising a step of making at least one thumb member in said mitt.

4. The method of claim 3 further comprising a step of using a portion of said thread to bind said finger containing area so as to form a protruding bound seam directed toward said interior of said pouch.

5. The method of claim 4 further comprising a step of using a portion of said thread to also bind each said thumb member so as to extend said protruding bound seam.

6. The method of claim 1 wherein said step of forming a mitt further comprises a step of creating said mitt with a minimum length dimension of approximately eight inches.

7. The method of claim 1 wherein said step of forming a pouch further comprises a step of creating said pouch with minimum length and diameter dimensions of approximately sixteen and eleven inches, respectively.

8. The method of claim 1 wherein said step of forming an opening in said pouch further comprises a step of creating said opening with a minimum length dimension of approximately five inches.

9. The method of claim 1 wherein said step of forming an opening in said pouch further comprises a step of creating said opening near to said top end.

10. The method of claim 1 further comprising a step of using a portion of said thread to further restrict movement of said two-part closure devices within said upper front pocket, said upper back pocket, said lower front pocket, and said lower back pocket.

11. The method of claim 1 wherein said step of forming a pouch comprises two-piece pouch construction.

12. The method of claim 1 wherein said step of forming a mitt comprises two-piece mitt construction.

13. The method of claim 1 further comprising a step of using a portion of said thread to top stitch said mitt against said pouch near to said opening for added strength in mitt/pouch connection.

14. The method of claim 1 further comprising a step of attaching at least one magnet to said pouch, near to said top end so that said pouch can be magnetically attached to a dryer housing between lint collection uses.

15. The method of claim 14 wherein each said magnet is selected from a group consisting of elongated magnets, rectangular magnets, and magnets having a circular cross-sectional configuration.

16. The method of claim 1 wherein said two-part closure devices provided are selected from a group consisting of elongated magnets, rectangular magnets, disk-like magnets having a circular cross-section, handbag frames, buttons and buttonholes, buttons and frogs, zippers, hook-and-pile types of fasteners, and snaps.

17. The method of claim 1 wherein said lightweight material comprises nylon, and wherein said soft, lint-attracting material comprises cotton.

18. The method of claim 1 wherein said step of using a portion of said thread to securely attach said open end of said mitt to said lightweight material, precedes said step of using said lightweight material to form a tubular pouch.

19. The method of claim 1 wherein said step of folding said bottom end of said pouch toward said interior to form a lower front pocket and a lower back pocket and said step of using a portion of said thread to stitch and secure said lower front pocket and said lower back pocket in place, each precedes said step of folding said top end of said pouch toward said interior to form an upper front pocket and an upper back pocket.

20. The method of claim 1 wherein said step of securing a first part of at least one of said two-part closure devices to said lower front pocket and said step of taking the corresponding second parts of each of said two-part closure devices used in said lower front pocket and securing said second parts to said lower back pocket in positions opposed to said first parts that enable engagement between corresponding first and second parts of each of said lower closure devices used, each precedes said step of inserting a first part of at least one of said two-part closure devices into said upper front pocket.

* * * * *